(12) United States Patent
Walz et al.

(10) Patent No.: US 7,128,960 B2
(45) Date of Patent: Oct. 31, 2006

(54) LAMINATE MATERIALS FOR FURNITURE AND FURNITURE PIECES INCORPORATING THE SAME

(75) Inventors: Kevin Randall Walz, via di San Francesco a Ripa, 18, 00153 Roma (IT); Barry Richard Walz, Shelter Island, NY (US)

(73) Assignee: Kevin Randall Walz, Rome (IT)

( * ) Notice: Subject to any disclaimer, the term of this patent is extended or adjusted under 35 U.S.C. 154(b) by 151 days.

(21) Appl. No.: 10/672,830

(22) Filed: Sep. 26, 2003

(65) Prior Publication Data

US 2005/0069690 A1  Mar. 31, 2005

(51) Int. Cl.
*B32B 5/12* (2006.01)

(52) U.S. Cl. .................. 428/114; 428/535; 428/537.1; 428/394

(58) Field of Classification Search ................ 428/114, 428/535, 537.1, 394
See application file for complete search history.

(56) References Cited

U.S. PATENT DOCUMENTS

| | | | |
|---|---|---|---|
| 5,725,929 A | 3/1998 | Cooke et al. | |
| 6,051,301 A | 4/2000 | Tingley | |
| 6,287,677 B1 | 9/2001 | Ishihara et al. | |
| 6,565,959 B1 * | 5/2003 | Tingley | 428/292.4 |
| 6,592,962 B1 * | 7/2003 | Edwards et al. | 428/114 |
| 6,749,921 B1 * | 6/2004 | Edwards et al. | 428/114 |

OTHER PUBLICATIONS

*Big News At Milan Forniture Fair*, www.poltronafrau,it/news/00/newpord2000.htm, Jun. 2000.
Paolo Rizzato, Alberta Meda, *LOLA*, www.galleriadesign.clac00.it/galleria/oluce/lola.html, 1989.
Cellos, *Quintus Stringed Instruments*, www.gstrings.com/cello.htm, Apr. 2003.
*Arbor Sports Collection*, www.arborsports.com/pages/home, Apr. 2003.
Flexural Strengthening, University of Delaware, Jun. 1997.
*Carbon Fiber Seating*, Accessible Designs, Inc., San Antonio, Texas 78251, Mar. 2003.
*Carbon Fiber/Wood Rib Egret*, Mercator Boats, Inc., Fredericksburg, VA 22405, Sep. 2002.

* cited by examiner

*Primary Examiner*—Leszek B. Kiliman
(74) *Attorney, Agent, or Firm*—Gottlieb, Rackman & Reisman, P.C.

(57) ABSTRACT

Several laminate materials are provided that are particularly useful for making furniture pieces. The laminate materials may include several interleaved wood veneer and carbon fiber layers. The thickness and characteristics of these layers are chosen so that the resultant material can be used either as a support member, such as a leg, that must withstand large tensile and/or compressive forces, or is thin and flexible, for example for making chair seats or backrest. Another laminate material includes a thick stiff core. This laminate material is used for furniture members that must resist warping, such as table tops.

14 Claims, 5 Drawing Sheets

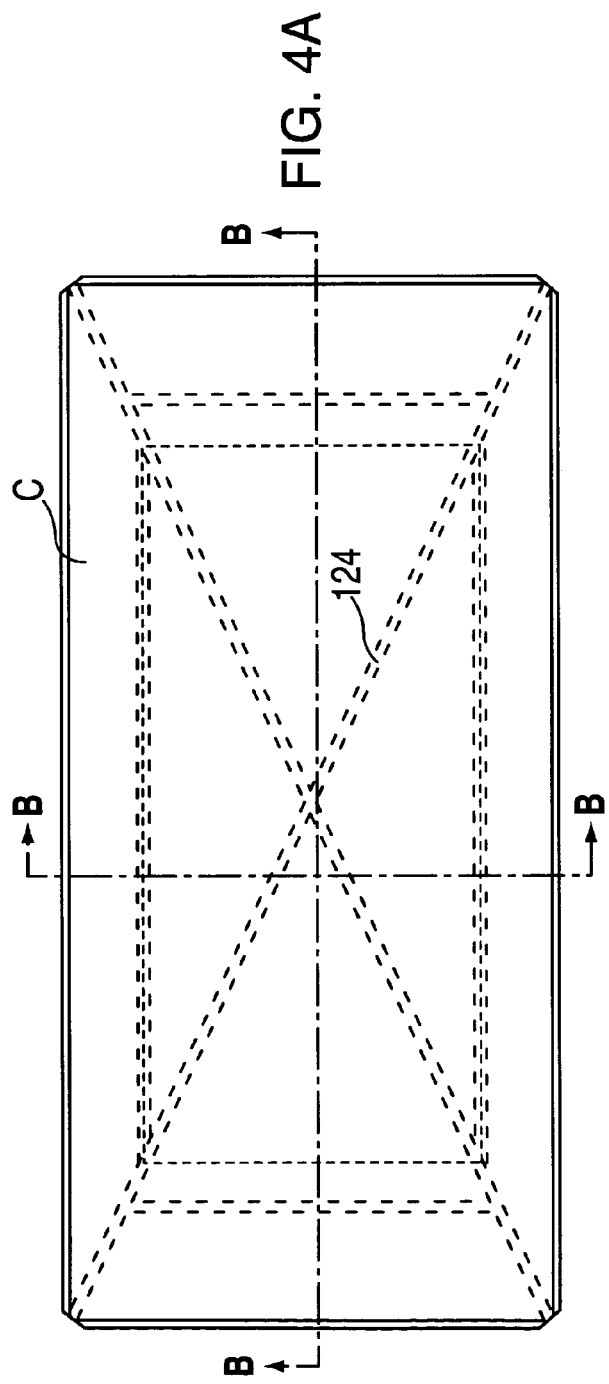
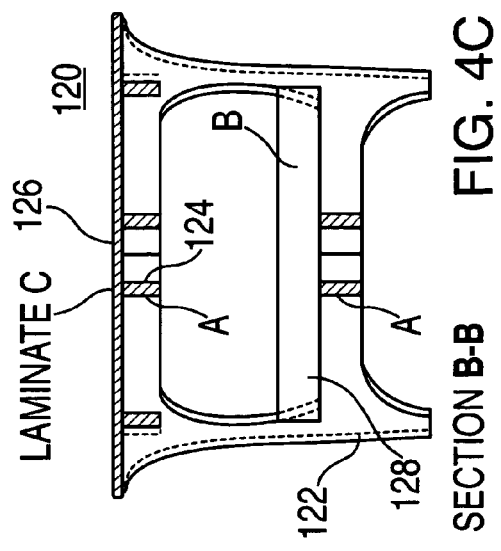
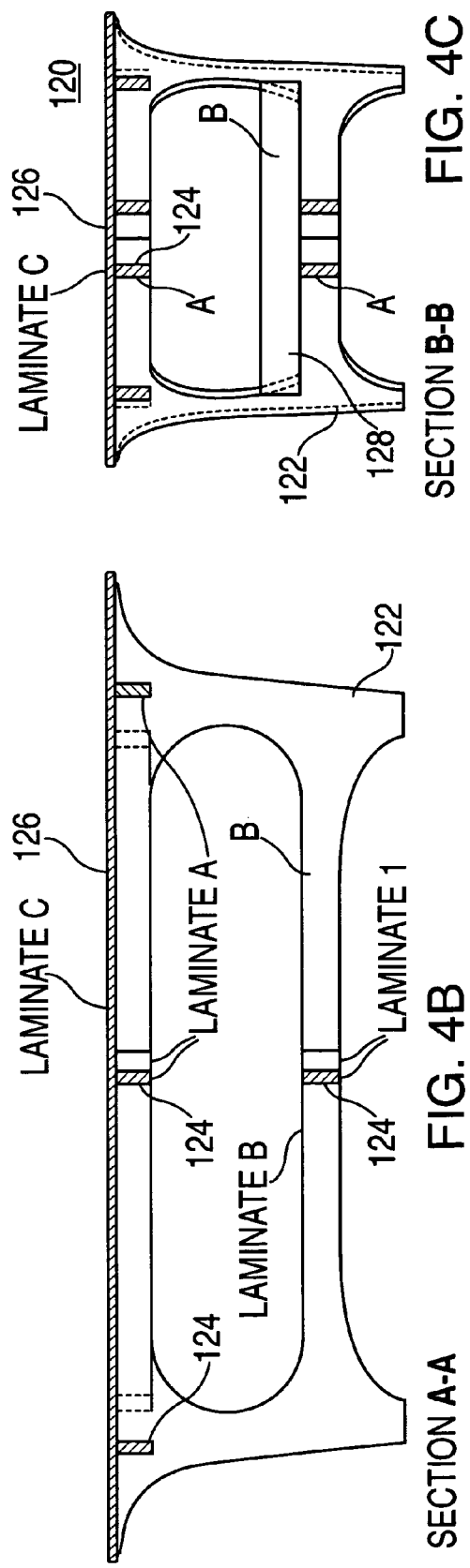

LAMINATE MATERIALS FOR FURNITURE AND FURNITURE PIECES INCORPORATING THE SAME

BACKGROUND OF THE INVENTION

1. Field of Invention

This invention pertains to novel and improved laminate materials for making furniture and other similar articles, and furniture pieces incorporating said laminate materials. The materials comprise various layers of natural wood and carbon fibers resulting in a composite assembly with improved structural characteristics and enhanced aesthetic appearance.

2. Description of the Prior Art

Lumber and Plywood

Lamination, the bonding of two or more layers of materials, has been used extensively in the furniture industry for about 100 years. Laminated materials are available in various sizes and weights and are used as stock items for making various pieces of furniture that are inexpensive and strong, and can be made be using mass-production techniques.

The origins of laminated materials are in forestry. The production of wood stock materials obtained by merely cutting up trees is wasteful, inefficient, and as the supply of trees is dwindling, very expensive. Therefore, lumber yards began searching for ways of producing lumber faster, at lower cost and maximizing use of the raw material and the byproducts of the production of wood stock. As a result, several engineered materials were invented which are widely used today. The first of these engineered materials is plywood, which is usually a lamination of many layers of wood to make a rigid, planar panel. Another example of a lamination is OSB (compressed wood chips) laminated with another material on its surface, such as wood veneer, Formica®, sheet metal, etc. In general, a "laminated material" is one composed of several layers, bonded with a thin layer of glue.

A drawback to plywood is that by its nature it is heavy and looks cheap and unappealing. In the manufacturing process, the wood is impregnated with glue and compressed at high pressure to create a bond that does not deteriorate over time. The resulting product is heavier (i.e., has a higher density) as compared to solid wood. In addition, the glues used in the process are toxic and formaldehyde, used to help the glue penetrate the wood, is a carcinogen. Hence, the production of plywood is environmentally undesirable. Because of their low-quality appearance, plywood and particle board are either covered up with thin surface layers having a more decorative look, or painted, thereby increasing their cost of manufacture.

One example of how a plywood laminate used in the furniture industry is the "Boachair", made by Emmemobili in Italy (see "iMade 2001, Ways of producing: Rigor and invention in the Italian furniture industry", pp. 76–77). This chair is made of four layers of wood, bent and glued, using staggered joints between the layers, to make a continuous tubular shape. The layers of wood are made of beech, which is flexible enough to be curved when subjected to heat and compression before the glue bonds the layers together.

Carbon Fiber

Carbon fiber is a material that was developed and used first in the aerospace industry. The material it is unique because it has a high elastic inflection in combination with its extremely high tensile strength. Carbon fiber consists of a textile fabric woven of continuous fibers of carbon and suspended in a resinous base, usually vinyl ester, polyester or an epoxy resin. Carbon fiber is desirable because of its high strength-to-weight ratio, as well as the ease with which it is molded into many shapes.

Carbon fiber is also used extensively in the automotive industry, ship building, sporting goods, and even in eye-glasses, but very little in the furniture industry. Existing examples of carbon fiber in the furniture industry include a 15-foot table top (made of only carbon fiber) by Canadian designer Ron Arad; a very thin, light chair originally produced by Yamaha company in the 1960s; lamps with carbon fiber structures (http://www.galleriadesign.clac00.it/galleria/oluce/lola.html); wheelchairs (see http://accessibledesigns.com/seating.html); and a chair and table made entirely of carbon fiber by Poltrona Frau (http://www.poltronafrau.it/news/00/newprod2000.htm—"Wing"product description).

Wood and carbon fiber laminates have been used to make simple, utilitarian outdoor equipment such as canoes, oars, paddles (see http://www.17 poundcanoes.com/carbon.htm) and snowboards which are laminated from wood and carbon fiber or fiberglass (http://www.arborsports.com/pages/main index 03.html).

In addition, some musical instruments also have some components that are also made of carbon fiber, which is then painted to look like wood (see for instance http://www.g-strings.com/cello.htm).

However, no laminate materials are known that are formed of layers of wood and carbon fibers and used to make furniture pieces.

SUMMARY OF THE INVENTION

The present invention pertains to a novel laminate material having structural and aesthetic characteristics particularly desirable for furniture pieces and other similar items, and furniture pieces and the like made from such laminates. Several different types of novel laminate materials are disclosed, each having specific characteristics that render them suitable for specific members of a furniture piece. More particularly, some laminate materials are preferably used for members that provide structural support and strength for the furniture articles and resist tensile and compressive loads. These materials are referred to herein as support laminate materials.

Another type of laminate materials can be made that is flexible and can be shaped easily into various three dimensional shapes. This type of laminate material is referred to herein as a thin laminate material.

A third type of laminate materials has been designed that have excellent dimensional stability and resists warping. This laminate material is used for various platforms, such as table tops, and is referred to herein as a platform laminate material.

In one aspect of the invention, a laminate material includes several alternating layers of wood and carbon fibers and/or artificial fibers, such as fiberglass. By varying the number, composition and size of the layers, several types of laminates can be formed that can act as either a support member, a flexible member or a platform member for a piece of furniture. Importantly, all the laminates have wood layers that are used to provide both structural strength and a highly desired aesthetic look. Moreover, the laminate materials can be used to design furniture pieces based on architectural principles previously used only on an architectural scale to make large structures (see for instance, http://www-.ce.udel.edu/faculty/chajes/flexural.html).

The alternating layers of wood and carbon fiber take effective advantage of tensile strength of carbon fiber. The combination of the natural wood with the fine black lines of carbon fiber at the edges is aesthetically pleasing, but it is important that a wood be chosen which has structural characteristics that match the properties of the carbon fiber. If a wood is chosen that is too soft, i.e. high modulus of elasticity, the end product, such as a chair, has too much flexibility and could easily break even with the carbon fiber because of the dynamic nature of its load during normal use. Certain woods are too brittle to use in some embodiments, especially in laminates where the thin wood veneers are curved for strength (curved table surfaces) or for comfort (chair seat and backrest).

The flexibility of the laminate materials is modulated by the selection and size of the wood layers. The highly desirable aesthetic properties of wood are undiminished because wood layers are used as much as possible for all visible surfaces. Thus, in the present invention an optimum balance is obtained between the physical and aesthetic characteristics of the wood layers on one hand and the structurally desirable carbon fibers on the other.

Advantageously, because of the special characteristics of its members, and their reduced thickness, a furniture piece produced using the inventive laminate materials has a unique, airy look that is aesthetically pleasing, yet highly functional. Moreover, the furniture piece is remarkably light even though its primary content is solid wood. Furthermore, because it is layered, the carbon fiber layers stabilize the wood thereby eliminating, or at least reducing warping. Unlike other similar materials, such as plywood, hollow constructions, or veneered resin-based materials, the inventive laminate material retains all the aesthetic properties of wood, such as look, feel, flexibility and even the sound, which is neither hollow nor dull, but full and resonant.

As discussed above, it has been found that various pieces of furniture can be made of three distinct types of laminates constructed in accordance with the present invention: a support laminate material, a thin laminate material and a platform laminate material.

The support laminate material is made of three wood layers interspersed with two carbon fiber layers, with the innermost or central wood layer being thicker and the two outer wood layers being thin veneers. This laminate material is used for all furniture members that are subject to, and must resist relatively large tensile and compressive loads, such as table legs, chair legs and frames, etc.

The thin laminate material also consists of three layers of wood alternating with two layers of carbon fiber. However, in this material, the three wood layers are very thin veneers, while the carbon fiber layers are somewhat thicker than the ones used for the support laminate material. This laminate material is preferably used where curved surfaces (for aesthetic and ergonomic purposes) and some flexibility (for ergonomic purposes) are desired, such as seats, back rest, etc. Members made of thin laminate are not expected to be subjected to large loads.

The platform laminate material consists of a core panel of a light weight wood, such as balsa wood, which is prelaminated with fiberglass, a lower cost, less strong woven fiber framed with wood and then laminated with wood veneer on the two faces. In this laminate the strength of carbon fibers is not required. This platform laminate material is ideal for table tops and other furniture members that require a substantial thickness, a strong, damage-resistant edge, and must be extremely resistant to warping. The solid wood edge is also important for giving a styled and protective shape to the table top edge with a router.

BRIEF DESCRIPTION OF THE DRAWINGS

FIGS. 4A, 4B and 4C show respectively, a top view, a front cross-sectional elevational and a side cross-sectional elevational view of a rectangular table constructed from the inventive laminate materials.

DETAILED DESCRIPTION OF THE INVENTION

DIferent members of a piece of furniture perform various functions and, therefore, several different laminate materials have been developed to perform these functions. Three such laminate materials are shown in FIGS. 1A–D. It should be understood that these figures are provided for illustrative purposes only, and are not to scale.

Figure 1A:
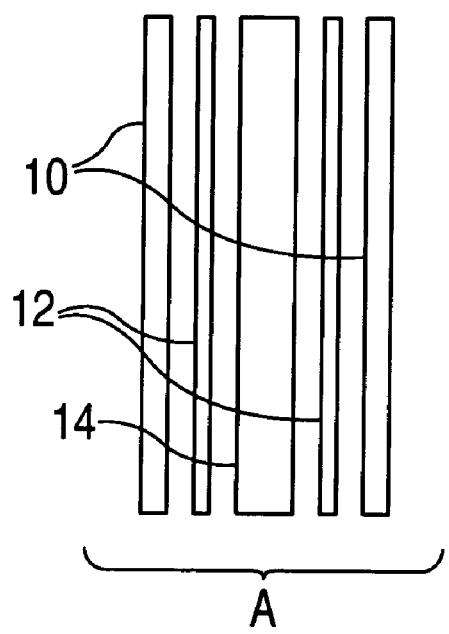
FIG. 1A shows a cross-sectional exploded view of a support laminate material constructed in accordance with this invention.

Laminate material A, the support laminate material, is shown in FIG. 1A, and it consists of five layers: two outer veneers 10 made of wood; two carbon fiber layers 12 disposed inwardly of the veneers 10 and a central wood layer 14 disposed between the carbon fiber layers 12. In the examples discussed here, the wood veneer layers 10 have a thickness of 0.100 in, the central wood layer 14 has been planned to 0.226 in and the carbon fiber layers 12 made of plain weave fibers having a weight of 5.7 oz and a thickness of 0.010". The overall thickness of laminate material A is about ⅞ in. It should be understood that the laminate material A can be made of layers having other dimensions, and can have more than five layers. Laminate material A is a support laminate material used for structural support members that are subjected to relatively large tensile and compressive loads, such as table legs, chair legs, back supports, mirror frames, etc.

Figure 1B:
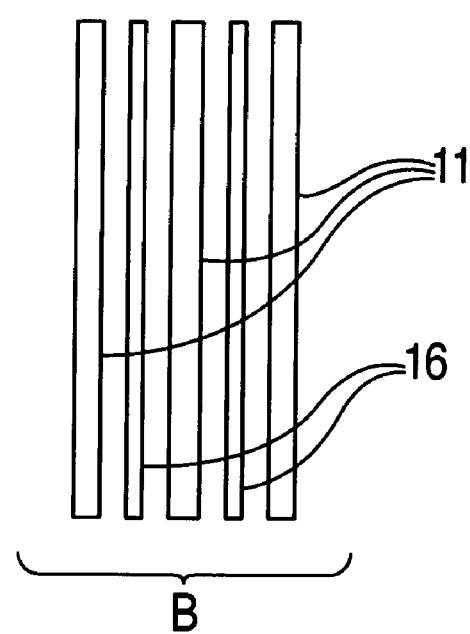
FIG. 1B shows a cross-sectional exploded view of a thin laminate material constructed in accordance with this invention.

Laminate material B, the thin laminate material, is shown in FIG. 1B and has a similar structure to laminate material A. It has three veneer layers 11, two disposed to form the outer skin of the laminate material and the third forming the central wood layer thereof. The laminate further includes two carbon fiber layers 16. Wood layers 11 have similar composition to the wood layers 10 in FIG. 1A, but are much thinner, for example, about 0.045". Carbon layers 16 are a little heavier then layers 12 and consist of an 8.3 oz twill carbon fiber with a thickness of 0.015" The thin laminate material B used in the examples shown below is about 1/8" thick, however, thin laminate materials with other thicknesses may be used as well.

The thin laminate material B is used for furniture members that require some flexibility or need to be warped into some two or three-dimensional shape but is not expected to be subjected to large tensile or compressive forces. Laminate material B can be used to make chair seats, chair backs, and other similar members.

Laminate materials A and B can be made into planar sheets and then cut to any dimension using standard woodworking tools. They are made by wetting the interior surfaces of the respective layers with an adhesive, such as a high quality quick-drying epoxy, and forming a sandwich therewith in a vacuum press that provides a strong and even pressure to all the layers. Epoxy is particularly advantageous because it is strong, light, flexible and is effective even when applied in a very thin sheet.

Alternatively, the layers, after wetting, are introduced into a wooden form having the desired shape and size, and then subjected to a high pressure. The resulting laminate material can then be trimmed or cut to size, if required.

Sandwiching a wood layer between two layers of carbon fiber is advantageous because the wood layer acts to concentrate the forces in the carbon fiber layers while the carbon material is flexing.

Figure 1C:
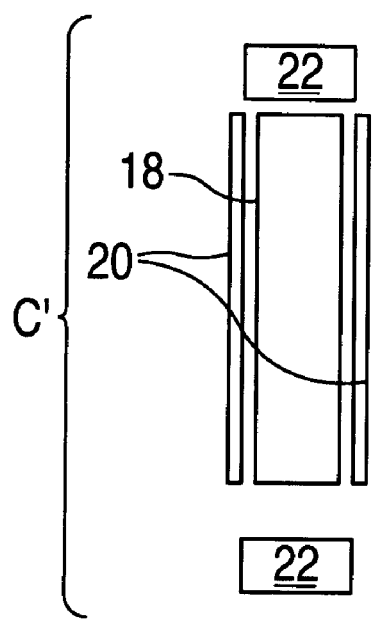
FIG. 1C shows a cross-sectional exploded view of an intermediate layer.
Figure 1D:
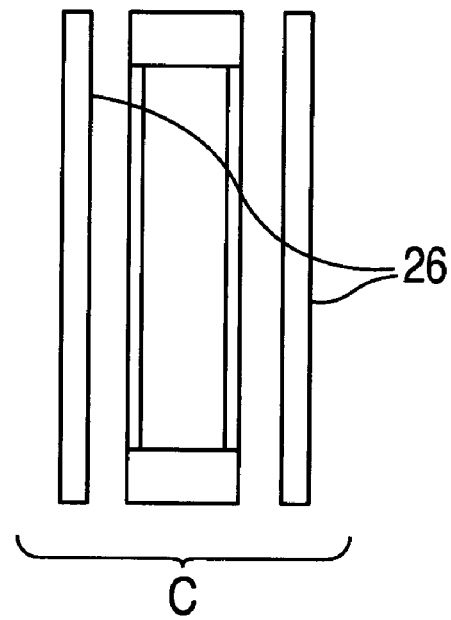
FIG. 1D shows a cross-sectional exploded view of a platform laminate material constructed in accordance with this invention and including the intermediate layer of FIG. 1C.

Laminate material C, the platform laminate material, is made in two steps. First an inner or intermediate layer C' is made. As shown in FIG. 1C, this layer C' consists of a core 18 made of solid wood covered on its main surfaces by fiberglass skins 20. A frame of wood 22 is provided around the core. Frame 22 is made of wood as well and is typically, 1.25" wide and 0.375" thick. Once this intermediate layer C' is completed, it is then laminated between two wood veneers 26 to form the laminate material C, as shown in FIG. 1D. Because of its structure, typically laminate material C is preshaped to the rough final size of the furniture member. Its edges may be trimmed with a router or other similar tool to provide a customized edge. The overall thickness of laminate material C is about 7/16" although it can have other thicknesses as well.

Laminate material C is used for platform surfaces such as table tops, and for other similar furniture members that must resist warping.

Importantly, these laminate materials do not only have highly desirable aesthetic characteristics, but also have unusual structural characteristics that enable a furniture designer to use them to make furniture pieces using architectural techniques, with the laminate pieces acting as structural members similar to ones used to make architectural structures. For example, structural laminate materials have structural characteristics similar to the I-beams used in construction.

Various kinds of wood may be used, including walnut, pine, fir, birch, etc.

While carbon fiber is preferred for layers 12, 16, other type of artificial fibers, such as fiberglass may also be used. Moreover, other laminate materials may also be made having more layers or even less layers.

FIGS. 2A–B, 3A–B, and 4A–C illustrate these concepts.

Figure 2A:
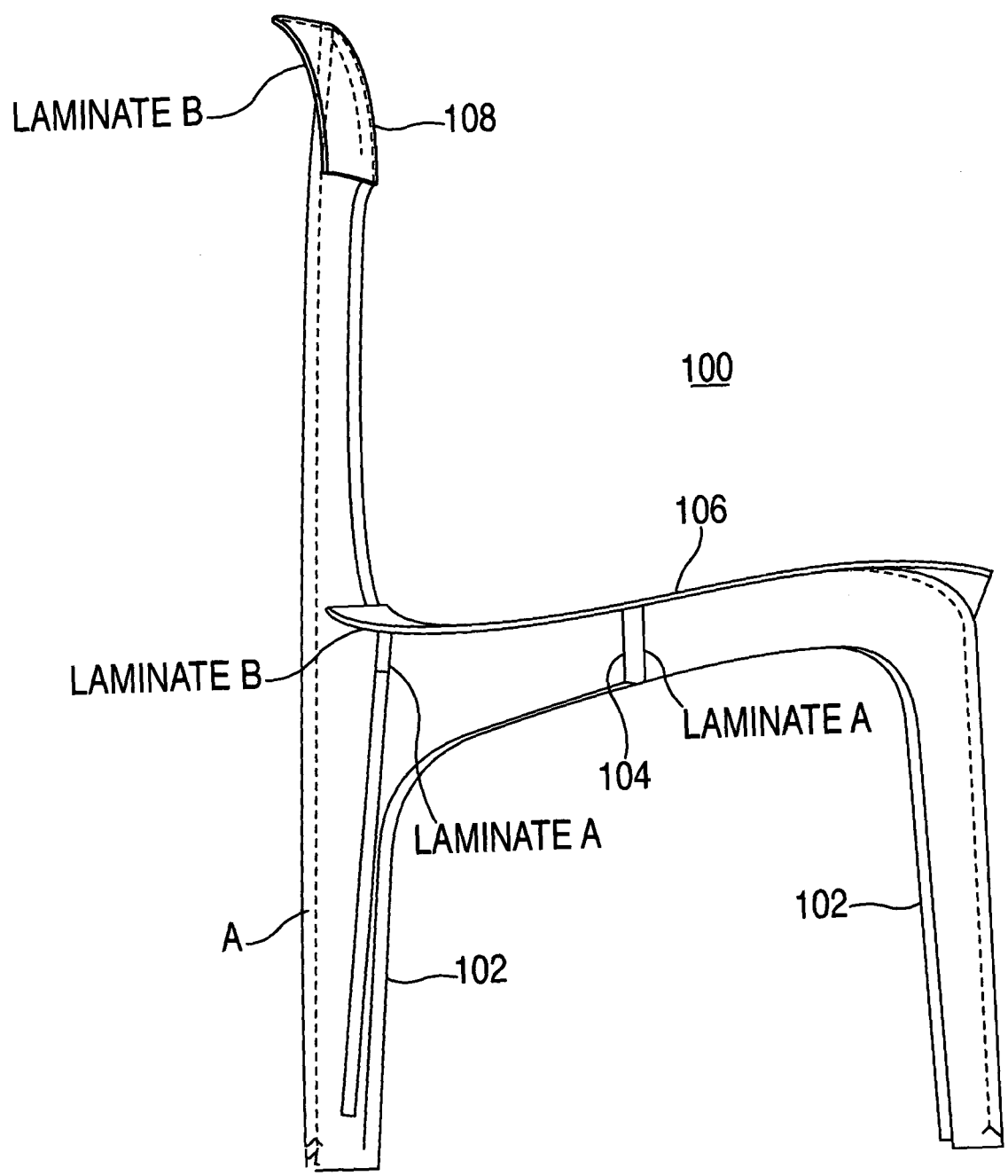
FIGS. 2A and 2B show, respectively, a side and front elevational cross-sectional view of a chair constructed from the inventive laminate materials.
Figure 2B:
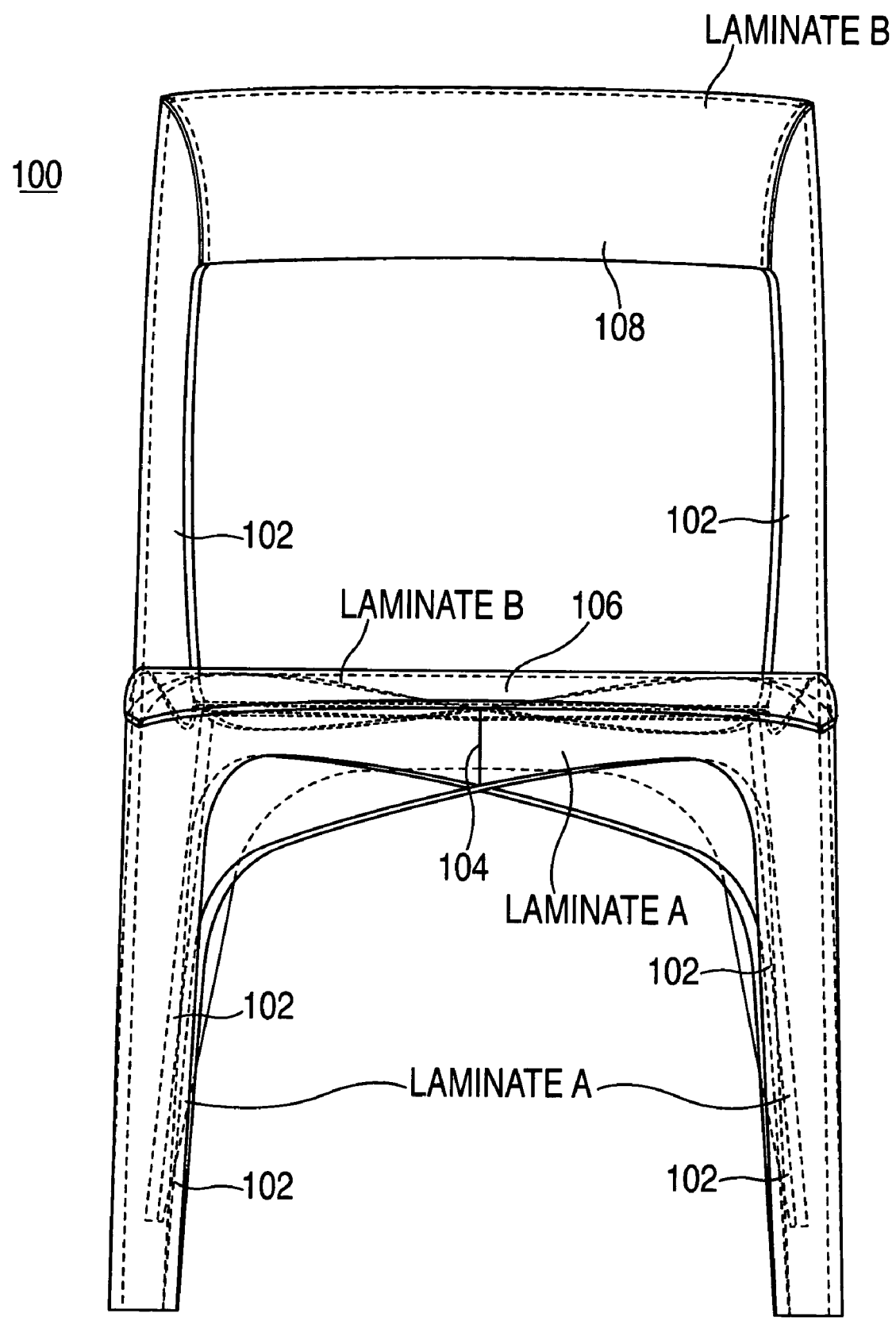

FIGS. 2A–B, show a chair 100. The legs 102 and cross members 104 of the chair are made of the support laminate material A while the seat 106 and the back rest 108 are made of thin laminate material B. The thin laminate material in this case can flex to provide comfort to the user while maintain is aesthetic look.

Figure 3A:
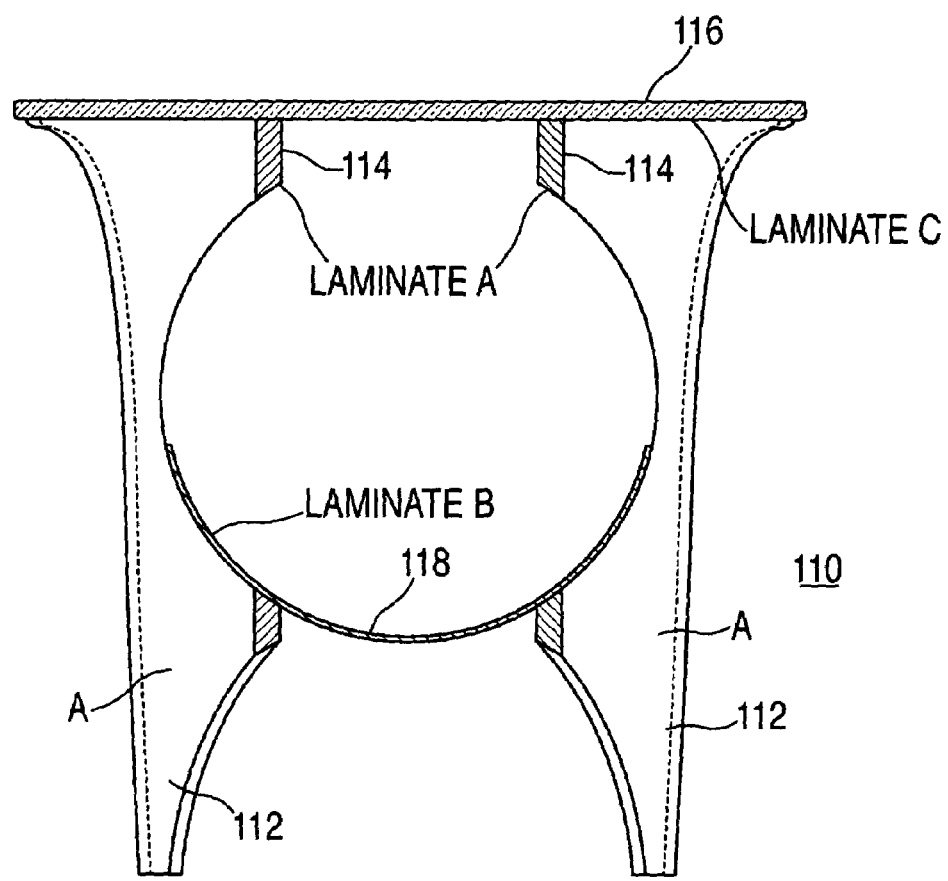
FIGS. 3A and 3B show, respectively, an elevational cross-sectional view and a partial top view of a low square table constructed from the inventive laminate materials.
Figure 3B:
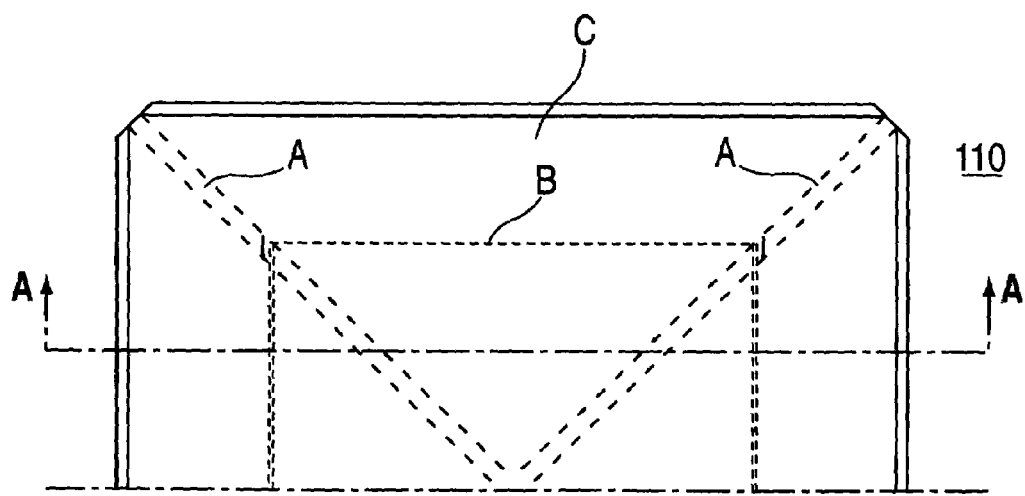

FIGS. 3A and 3B show a low square table 110. Its legs 112 and cross-members 114 are made of the support laminate material A. Its top 116 is made of platform laminate material C. In addition, a U-shaped member 118 is added below the table top to hold the table together. It also provides a shelf to hold magazines or other items. This member 118 is made of thin laminate material.

FIGS. 4A–C show a low rectangular table 120. Its legs 122 and cross-members 124 are made of support laminate material A. Its top 126 is made of platform laminate material C. The legs 122 are attached to a member 128 that is curved and made of thin laminate material. The member 128 secures the top and the legs so that they do not wobble. Advantageously, the member 128 also acts as a decorative shelf.

The wood layers 10, 11 and 14 provide both functionality and esthetic appeal.

While the invention has been described with reference to several particular embodiments, it is to be understood that these embodiments are merely illustrative of the principles of the invention. Accordingly, the embodiments described in particular should be considered as exemplary, not limiting, with respect to the following claims.

We claim:

1. A furniture piece comprising:
a first member formed of a support laminate material; and
a second member formed of a thin laminate material;
wherein laminate materials include two outer wood veneer layers, two artificial fiber layers having high structural support properties and an inner wood layer, said support laminate material being composed of fiber and wood layers having properties selected to provide said support laminate material with high structural strength for supporting loads and said thin laminate material being composed of fiber of wood layers properties selected to provide said laminate material with flexibility for forming curved surfaces for said furniture piece;
wherein in said first laminate the inner wood layer is substantially thicker then said two outer veneer layers; and
wherein in said second laminate the inner wood layer has about the same thickness as said outer veneer layers.

2. A furniture piece comprising:
a plurality of first members formed of a support laminate material, said plurality of first members including a plurality of legs for said furniture piece; and
a second member formed of a platform laminate material, said second member forming a flat surface for said furniture piece;
wherein said support laminate material includes two outer wood veneer layers, two artificial fiber layers having high structural support properties and an inner wood layer, said layers having thicknesses selected to provide high structural strength for said first members for supporting loads, said artificial fiver layers and said inner wood layer being substantially thicker then said outer veneer layers; and wherein said platform laminate material includes two outer wood veneer layer and an inner layer made of material resistive to warping.

3. The furniture piece of claim 2 wherein said inner layer includes a core made of a hard wood and a frame surrounding said core.

4. A furniture piece comprising:
a first set of elements formed of a thin laminate material and a second set of elements formed of a support laminate material;

wherein said laminate materials are formed of at least five alternating layers of wood and layers of artificial fibers having a high structural strength, wherein artificial fibers in said support laminate material is substantially thicker than the artificial fibers in said thin laminate material;

wherein the thin laminate material includes three layers having substantially equal thicknesses and consisting of a wood veneer and two layers of artificial fibers, the layers of artificial fiber being substantially thicker then the layers of wood veneer;

wherein the support laminate material includes two outer layers of wood veneer, an inner layer of wood core, said inner layer of wood core being substantially thicker then said veneer wood layers, and two intermediate artificial fiber layers having about the same thickness as the inner layer of wood and being disposed between one of said outer wood veneer layers and the core wood layers respectively;

wherein said first elements are flexible to form curved surfaces for said furniture piece and said second set of elements include legs for supporting said furniture piece.

5. The furniture piece of claim 4 further comprising a platform element formed of a platform laminate material including a core panel made of a light material and a laminated frame.

6. The furniture piece of claim 5 wherein said platform laminate material further includes two veneer layers.

7. The furniture piece of claim 4 wherein said support laminate material includes two layers of wood veneer defining the outer surfaces of the support laminate material, two layers of carbon fiber layers, and a central wood layer that is thicker than the central wood layer of the thin laminate material, wherein the layers forming said support laminate have thickness selected to provide said support members load bearing strength; and wherein said layers forming said thin laminate have characteristics selected to allow said laminate to be bent to form curved surfaces.

8. The furniture piece of claim 4 wherein said structural component is one of a carbon fiber layer and a fiberglass layer.

9. The furniture piece of claim 4 wherein the structural component in said support laminate material is a plain weave carbon fiber layer having a weight of about 5.7 oz.

10. The furniture piece of claim 4 wherein the structural component in said thin laminate material is a twill carbon fiber layer having a weight of about 8.3 oz.

11. The furniture piece of claim 4 wherein said first and second set of elements cooperate to form a chair.

12. The furniture piece of claim 4 wherein said first and second set of elements cooperate to form a table.

13. The furniture piece of claim 4 further comprising a third member formed of a support laminate, said support laminate including two wood veneer layers forming the outer surfaces of the support laminate, two layers of artificial fibers disposed adjacent to said veneers and a central layer formed of solid wood and having a thickness of selected to prevent said central layer from warping, said third member defining a flat surface for said furniture piece.

14. The furniture piece of claim 13 wherein said platform laminate further comprises a frame surrounding said layers.

* * * * *